United States Patent

Smith et al.

[11] Patent Number: 5,930,257
[45] Date of Patent: *Jul. 27, 1999

[54] NETWORK ROUTER THAT ROUTES INTERNETWORK PACKETS BETWEEN DISTINCT NETWORKS COUPLED TO THE SAME PHYSICAL INTERFACE USING THE PHYSICAL INTERFACE

[75] Inventors: Andrew Smith; Asher Waldfogel, both of Palo Alto, Calif.; Steven R. Willis, Acton, Mass.

[73] Assignee: Baynetworks, Inc., Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/591,891

[22] Filed: Jan. 25, 1996

[51] Int. Cl.⁶ .................................................. H04L 12/66
[52] U.S. Cl. ............................................ 370/401; 370/404
[58] Field of Search .................................. 370/401–405, 370/465

[56] References Cited

U.S. PATENT DOCUMENTS

| | | | |
|---|---|---|---|
| 5,210,748 | 5/1993 | Onishi et al. | 370/85.13 |
| 5,423,002 | 6/1995 | Hart | 370/401 |
| 5,434,863 | 7/1995 | Onishi et al. | 370/85.13 |
| 5,600,644 | 2/1997 | Chang et al. | 370/404 |

OTHER PUBLICATIONS

Newton, Harry, "Newton's Telecom Dictionary", 9th Edition, pp. 978–979, 1995.

*Primary Examiner*—Melvin Marcelo
*Attorney, Agent, or Firm*—Blakely Sokoloff Taylor & Zafman LLP

[57] ABSTRACT

A network router that routes internetwork packets between distinct networks coupled to the same physical interface. The router comprises a port for coupling to a multiplexing fabric that carries internetwork traffic for a plurality of distinct networks and a routing engine that routes internetwork traffic between the plurality of networks using the port. According to various embodiments, the multiplexing fabric may be a switched fabric or a shared media fabric. The multiplexing fabric may also be used to connect networks that operate according to different protocols to the same port.

16 Claims, 5 Drawing Sheets

NETWORK ROUTER THAT ROUTES INTERNETWORK PACKETS BETWEEN DISTINCT NETWORKS COUPLED TO THE SAME PHYSICAL INTERFACE USING THE PHYSICAL INTERFACE

FIELD OF THE INVENTION

The present invention relates generally to network routers and more particularly to a network router that routes data packets between networks coupled to the same physical interface.

BACKGROUND

Digital communications networks are used to interconnect digital systems or "hosts" so that the hosts may exchange information in an efficient manner. A common type of digital communications network is the Local Area Network (LAN), and a common type of LAN is commonly known as "Ethernet". A typical example of an Ethernet network includes a multiplicity of personal computers (PCs) and a laser printer interconnected by coaxial cable or twisted-pair wire. PCs coupled to the Ethernet network may share the laser printer or exchange electronic mail with one another. LANs typically have a physically limited area of service, and Metropolitan Area Networks (MANs) and Wide Area Networks (WANs) are used to interconnect more remote systems.

As an enterprise such as a business organization grows, so does its networking needs. A common method for meeting increased networking demands is to interconnect two or more networks. This method is called "internetworking," and internetworking devices such as repeaters (also known as "hubs" and "connectors"), bridges, and routers (also known as "gateways") are used to accomplish this task.

Repeaters, as their name implies, are used to "repeat" signals such that the physical size of a LAN may be increased. Bridges are used to interconnect LANs of the same type in a manner that results in the interconnected LANs operating as a single LAN.

Routers are internetworking devices that are used to interconnect distinct networks, however defined, to allow the exchange of information between the hosts of the interconnected networks. Routers may be used to interconnect multiple networks of the same or different network type. For example, a router may be used to interconnect two Ethernet LANs with a Token Ring LAN. Furthermore, routers may be used to interconnect physically distinct networks, logically distinct networks defined within a single physical network (e.g. virtual networks or emulated LANs), or a combination of physically and logically distinct networks.

Figure 1:
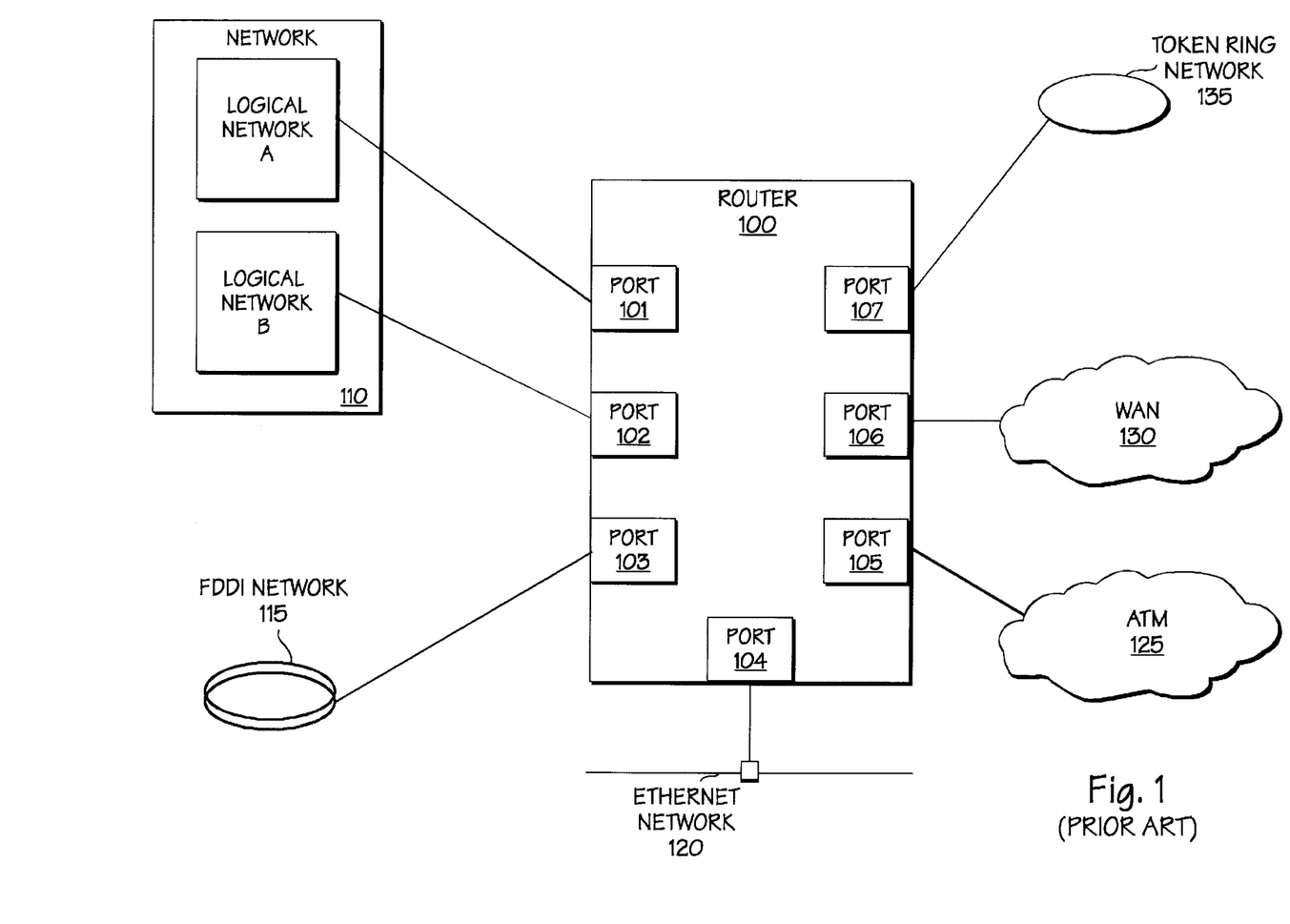
FIG. 1 shows a network router that operates according to the prior art.

Typically, each distinct network is specified by a unique network address and is connected to a router via its own physical interface. For example, FIG. 1 shows a router 100 that includes ports 101–107, each of which is coupled to a different network. A number of physically distinct networks are shown and include a network 110 having logical networks A and B defined therein, a Fiber Distributed Data Interface (FDDI) network 115, an Ethernet network 120, an Asynchronous Transfer Mode (ATM) network 125, a Wide Area Network (WAN) 130, and a Token Ring Network 135.

The number of ports that may be provided for a single router is limited by many practical considerations. Therefore, it would be desirable for providing a mechanism that allows for a reduction in the number of ports required to interconnect a multiplicity of distinct networks. In this manner, a single router may be used to interconnect more distinct networks than is practicable using prior art schemes.

SUMMARY OF THE INVENTION

Therefore, a network router that routes internetwork packets between distinct networks coupled to the same physical interface is described. The router generally comprises a physical interface (port) that is coupled to a plurality of distinct networks. According to one embodiment, a multiplexing fabric is provided to couple the distinct networks to the port. The router also includes a routing engine. When an internetwork packet is received from a first network via the port, the router determines how to route the internetwork packet. If the routing engine determines that the best route for the internetwork packet is via the port from which it was received, the routing engine routes the packet via that port. In this manner, the router routes internetwork traffic between distinct networks using a single physical interface.

The multiplexing fabric is used to provide distinct communications channels for each of the connected networks. According to one embodiment, the multiplexing fabric is provided by using a networking protocol such as ATM or FDDI. Internetwork packets are encapsulated using the networking protocol of the multiplexing fabric and forwarded to the router for processing. The multiplexing fabric may be used to provide distinct communications channels for networks that operate according to a multiplicity of different networking protocols.

Other features and advantages of the present invention will be apparent from the accompanying drawings and from the detailed description which follows below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Figure 2:
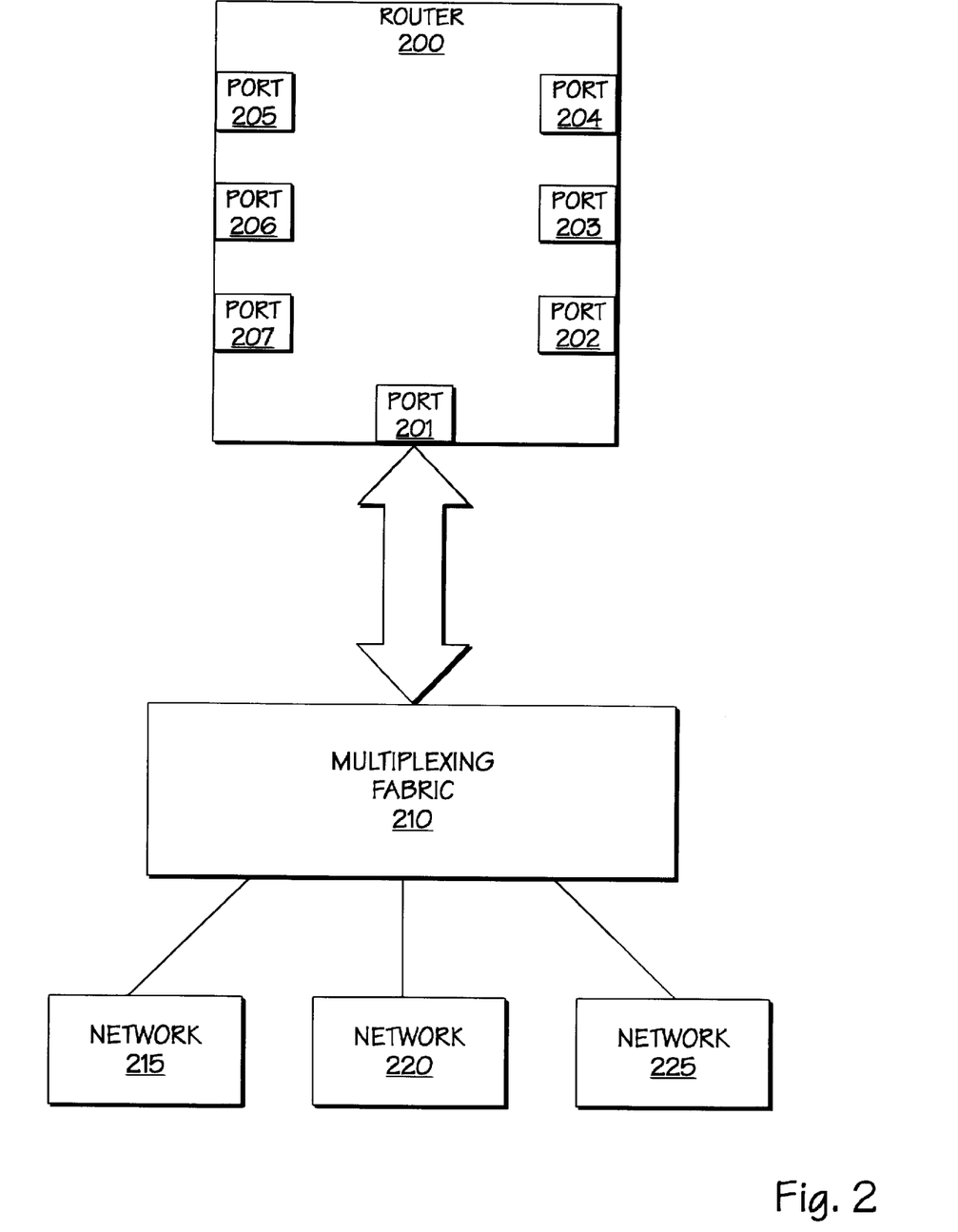
FIG. 2 shows a network router having a multiplexed port that operates according to a present embodiment.

FIG. 2 shows an arrangement wherein a router may route data packets between distinct networks coupled to the same physical interface. More specifically, FIG. 2 shows a router 200, a multiplexing fabric 210, and a plurality of distinct networks 215, 220, and 225 wherein each network 215, 220, and 225 has a unique network ID or address. Router 200 includes a plurality of ports 201–207, wherein port 201 operates as a multiplexed port for receiving and transmitting data packets from the plurality of networks coupled via multiplexing fabric 210. Although not shown, each of the remaining ports 202–207 may be single network ports or multiplexed ports for coupling router 200 to other networks.

Multiplexing fabric 210 is connected to multiplexed port 201 and to networks 215, 220, and 225 for carrying internetwork traffic for all of the connected networks. The terms "internetwork traffic" and "internetwork packet" will be understood to refer to network traffic sent between distinct networks. Multiplexing fabric 210 provides distinct communications channels for each of the connected networks such that each network only receives internetwork traffic destined for that network. As will be discussed, a "communications channel" does not require a distinct point-to-point link and may be provided in a number of different ways.

Multiplexing fabric 210 multiplexes the internetwork traffic of the connected networks such that router 200 receives the internetwork traffic of all of the connected networks via the same port 201. Router 200 determines the destination network (or networks) of internetwork packets received from port 201 and routes the internetwork packets appropriately. If router 200 determines that the destination network is coupled to router 200 via port 201, router 200 routes the internetwork packet via port 201. In this manner, router 200 routes data between distinct networks coupled to the same interface.

Figure 3:
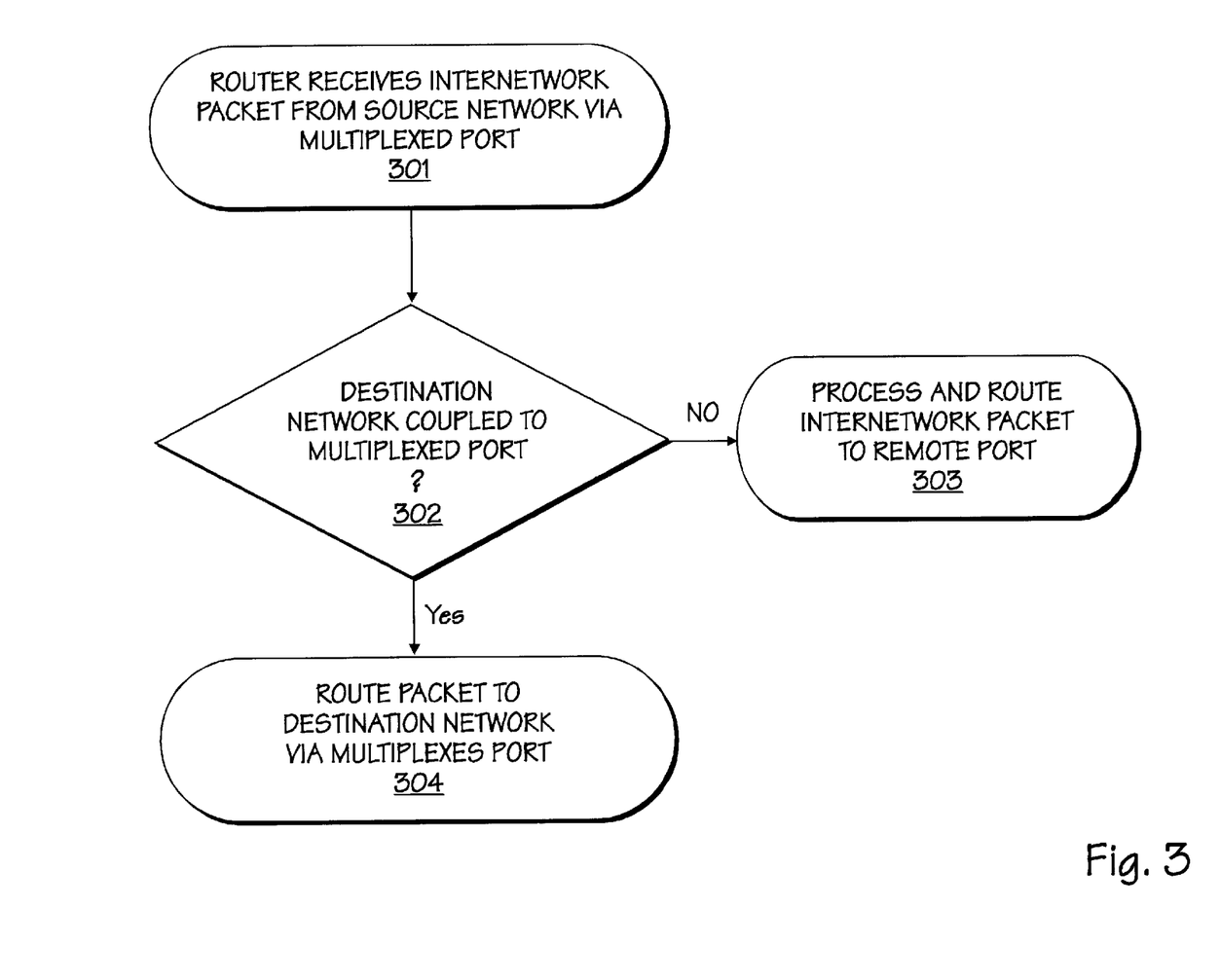
FIG. 3 shows a general method of operation for the network router shown in FIG. 2.

FIG. 3 shows a general method used by router 200 to route internetwork data packets received via a multiplexed port. At process block 301, router 200 receives an internetwork packet from one of the networks connected to multiplexing fabric 210. At process block 302, router 200 determines the best route to the destination network. If the best route to the destination network is via another port, router 200 processes the internetwork packet appropriately and routes it through that port at process block 303. If the destination network is coupled to multiplexed port 201 or if the best route to the destination network is through multiplexed port 201, router 200 processes the internetwork data packet appropriately and routes it via multiplexed port 201 at process block 304.

Returning to FIG. 2, multiplexing fabric 210 may be implemented in a number of equivalent ways. For example, multiplexing fabric 210 may be implemented as a central hardware resource or in a distributed manner wherein the functionality of multiplexing fabric 210 is distributed between the router the connected networks. Furthermore, multiplexing fabric 210 may be provided in a circuit switched manner or by using a packet switched network protocol. According to the presently described embodiments, multiplexing fabric 210 is achieved by encapsulating internetwork packets using the data link layer protocol of a high bandwidth network type. For example, multiplexing fabric 210 may be provided by using the switched media of ATM or the shared media of FDDI or 100 Mbps Ethernet. Multiplexing fabric 210 may therefore be used to interconnect a number of lower bandwidth networks to the same physical interface.

Typically, multiplexing fabric 210 should be able to support the full bandwidth of the connected networks. For example, if 100 Mbps Ethernet is used as the multiplexing fabric, a maximum of ten 10 Mbps Ethernet should be connected for the multiplexing fabric. Wherein multiplexing fabric is a switched media, bandwidth oversubscription may be supported.

In order to ensure appropriate translation of data packets routed between different network types, a mechanism is needed to allow the router to discriminate between internetwork packets received via multiplexed port 201. One simple mechanism is to define a distinct communications channel for each network connected to multiplexed port 201 and to associate a specific network type for each connected network. In this manner, router 200 is able to determine what processing is needed simply by referring to the network types of the source and destination networks as indicated by the communications channels from which the internetwork packet is received and over which the internetwork packet is to be transmitted.

A number of different methods may be employed to define distinct communications channels for each network connected to multiplexing fabric 205. For example, time division multiplexing (TDM), wherein each communications channel corresponds to a predetermined time slot, and frequency division multiplexing (FDM), wherein each communications channel corresponds to predetermined frequency, are two possible alternatives. Other alternatives include, but are not limited to, the following: defining a unique address space for each communications channel; defining a unique channel identifier for inclusion in the header of internetwork packets; and defining a unique virtual channel (VC) for each communications channel.

Defining a unique virtual channel for each communications channel of the multiplexing fabric is a relatively straightforward process when the multiplexing fabric operates according to an ATM protocol.

Figure 4:
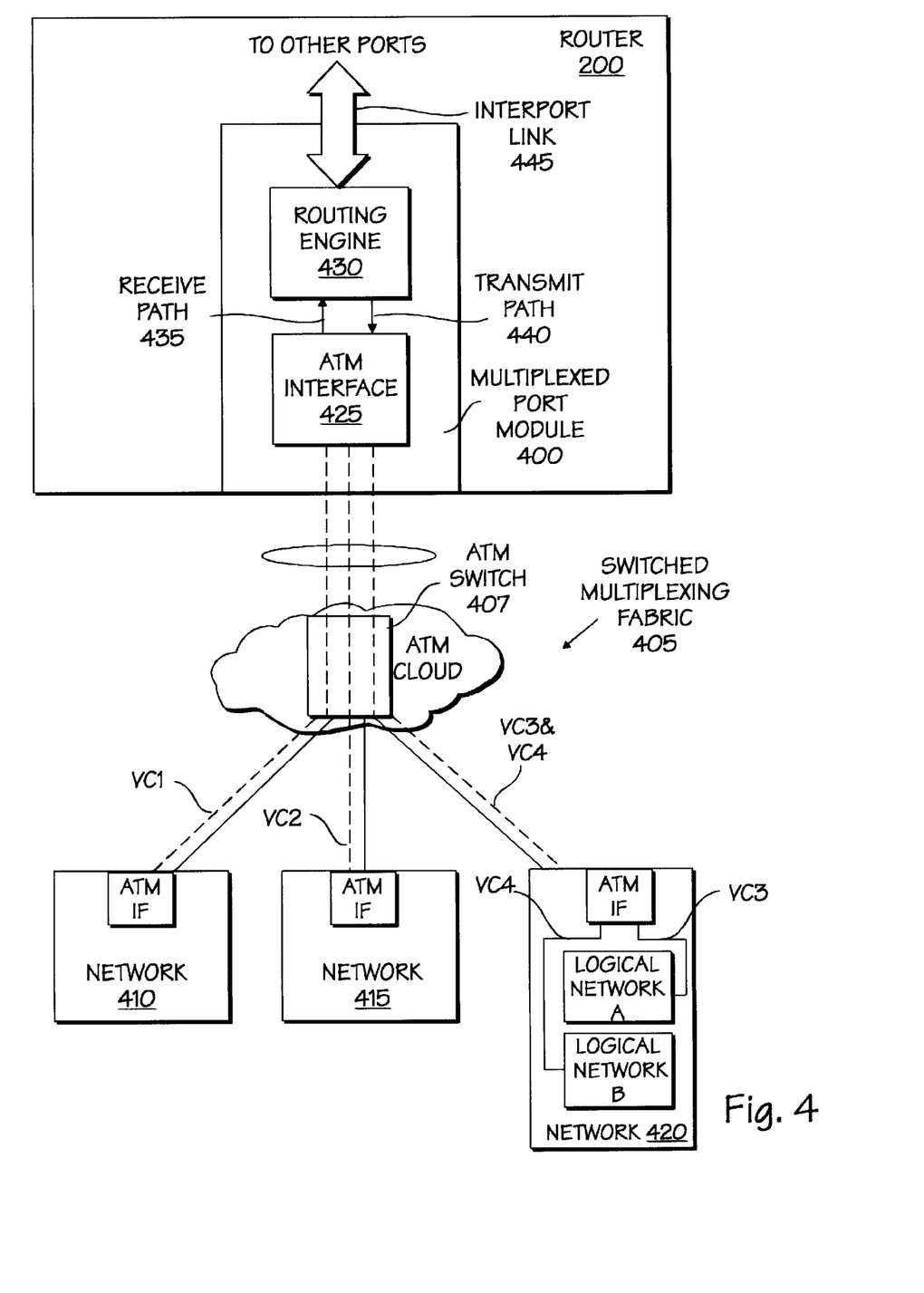
FIG. 4 shows a network router of one embodiment wherein the multiplexing fabric is a switched fabric.

FIG. 4 shows an arrangement wherein a switched multiplexing fabric is used to provide distinct communications channels for each of the networks connected to the multiplexed port. For the embodiment of FIG. 4, switched multiplexing fabric 405 comprises an ATM link 407, which may be, for example, a T1 line, an E1 line, or an OC3 line. Each of the connected networks 410, 415, and 420 includes an ATM interface ("ATM IF") that provides the physical interface to ATM link 407 as well as a number of services for accomplishing data transfer via ATM link 407. For example, for a network that does not already operate according to the data link layer protocol of ATM, the ATM interface includes a segmentation and reassembly (SAR) unit (not shown) for segmenting internetwork packets into cells for transmission to router 200 and for reassembling cells received from router 200 into internetwork packets for transmission to the connected network. As each distinct network is of a specific network type, each ATM interface is provided with a SAR unit that most efficiently segments and reassembles packets for that network type.

The topologies and devices of networks 410, 415, and 420 are not shown, and the ATM interfaces of the networks may be provided in any convenient manner. For example, the ATM interface of each network may be provided in an internetworking device such as a router or repeater of that network. Alternatively, a repeater may be interposed between the networks and ATM link 407 for providing a single ATM interface for all of the connected networks. Thus, each connected network 410, 415, and 420 would be connected to the repeater via a port compatible with its network type, and the repeater would include a fourth port for coupling to ATM link 407. Both of these alternatives are logically equivalent.

For the embodiment shown in FIG. 4, each communications channel is defined by a distinct VC. As shown, network 410 is coupled to router 200 via a first virtual channel VC1, network 415 is coupled to router 200 via second virtual channel VC2, and network 420 is coupled to router 200 via third and fourth virtual channels VC3 and VC4 wherein VC3 is provided as the communications channel for a logical network A, and VC4 is provided as the communications channel for a logical network B.

The router of FIG. 4 is shown as including a multiplexed port module 400 for controlling the routing of internetwork packets received via the multiplexed port and switched multiplexing fabric 405. Multiplexed port module 400 is shown as generally comprising an ATM interface 425 and a routing engine 430. Alternatively, multiplexing port module may only include ATM interface 425 and forward reassembled internetwork packets to a central routing engine used by all ports of the router. ATM interface 425 is typically more complicated than the ATM interfaces of the connected networks because ATM interface 425 must segment and reassemble internetwork packets received from different network types. ATM interface 425 may therefore be provided with a multiplicity of SAR units, one for each VC, but the same functionality may be achieved using a common SAR unit that executes different SAR programs for each identified network type.

When ATM interface 425 receives and reassembles an internetwork packet from a multiplexed port, ATM interface 425 forwards the reassembled internetwork packet to routing engine 430 via receive path 435. Routing engine 430 determines the network address of the destination network. If the network address of the destination network indicates that the internetwork packet should be routed via another port of the router, routing engine 430 forwards the internetwork packet to the associated port module of that port. If the network address of the destination network indicates that the internetwork packet should be routed via the multiplexed port, routing engine performs any necessary protocol translation and forwards the internetwork packet to ATM interface 425 via transmit path 440. ATM interface segments the internetwork packet and forwards the segmented packet to the destination network via the appropriate VC.

For example, network 410 may be an Ethernet LAN that has internetwork traffic bound for network 415, which may be a Token Ring LAN. The ATM interface of network 410 segments Ethernet packets into cells for transmission over VC1. Each of the Ethernet packets includes a destination network address indicating the network address of network 415. Each of the cells transmitted by network 410 include Virtual Path Identifier (VPI) and Virtual Channel Identifier (VCI) fields that indicate transmission over VC1. ATM interface 425 of multiplexed port module 400 receives and resegments the Ethernet packets and forwards them to routing engine 430. Routing engine 430 checks the destination network address and determines that the internetwork packets must be translated from the Ethernet protocol to the Token Ring protocol. Routing engine 430 performs the necessary processing and forwards the internetwork packets to ATM interface 425. ATM interface 425 segments the internetwork packets into ATM cells having VPI and VCI fields that indicate transmission over VC2. ATM interface 425 may determine the correct virtual channel number based on the destination network address, or routing engine 430 may inform ATM interface 425 of the correct virtual channel number. ATM interface 425 then forwards the internetwork packets as cells via VC2 to network 415. The ATM interface of network 415 reassembles the internetwork packets, which are allowed to propagate to the indicated host or hosts of network 415.

Figure 5:
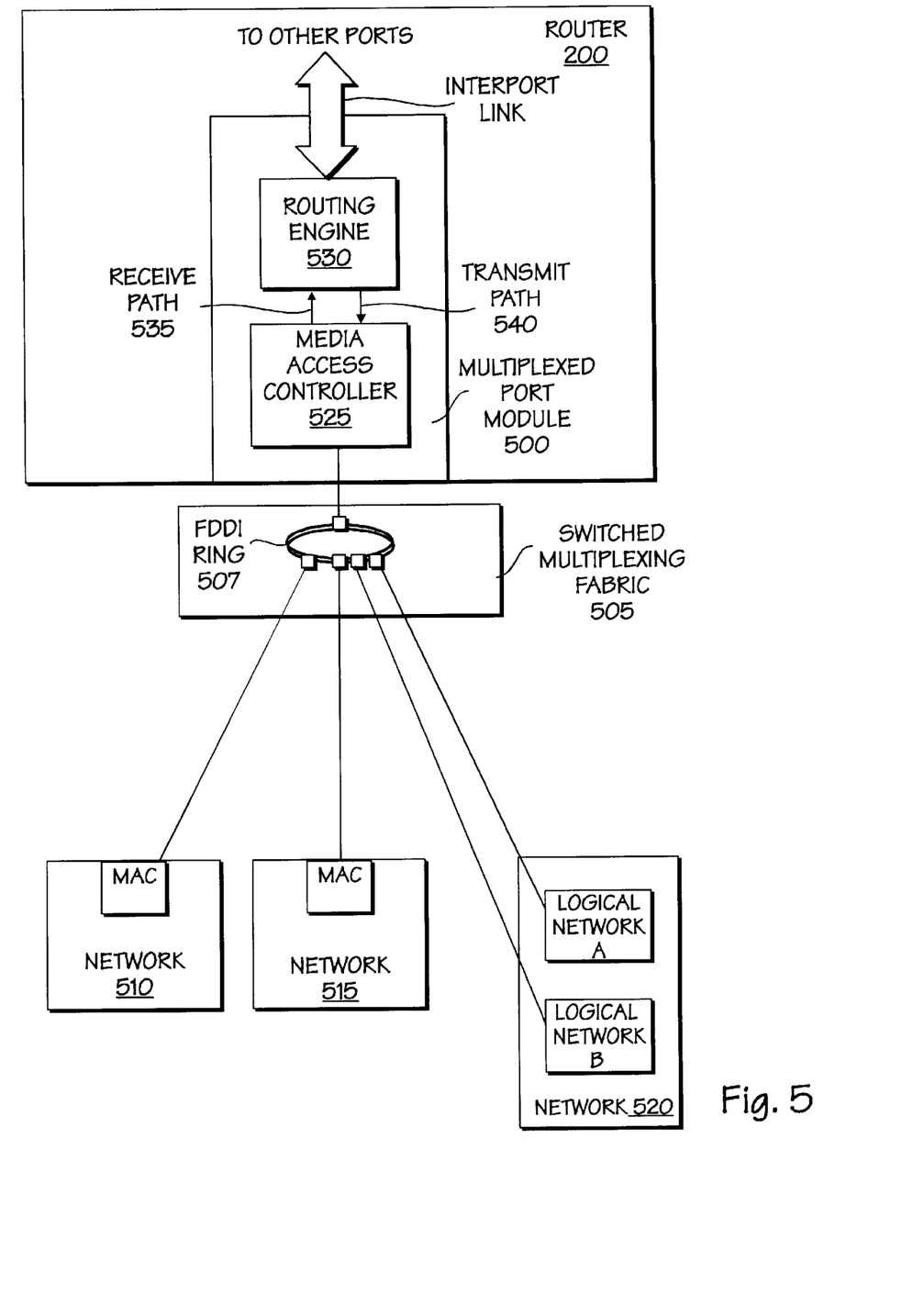
FIG. 5 shows a network router of one embodiment wherein the multiplexing fabric is a shared media fabric.

FIG. 5 shows an alternative networking arrangement wherein the multiplexing fabric uses a shared medium for multiplexing internetwork packets. Shared media multiplexing fabric 505 is shown as comprising an FDDI ring 507 to which each of the networks 510 and 515 and logical networks A and B are coupled as hosts. The router of FIG. 5 further shows that the multiplexed port module 500 is also coupled to FDDI ring 507 as a host.

Each of the networks is provided with a media access controller ("MAC") for interfacing to FDDI ring 507. The media access controllers of the connected networks are provided with the appropriate facilities for encapsulating internetwork packets in standard FDDI packets. Media access controller 525 of multiplexed port module 500 is provided with the appropriate facilities for encapsulating and decapsulating internetwork packets of various network types. Decapsulated internetwork packets are transferred to routing engine 530 via receive path 535, and routing engine 530 transfers internetwork packets for encapsulation by media access controller 525 via transmit path 540.

Each media access controllers of the networks and the multiplexed port module are each provided with a unique MAC address. To ensure security, the networks are not allowed to communicate directly with one another via the shared media multiplexing fabric. Instead, all encapsulated internetwork packets are forwarded to the router, which processes decapsulated packets and forwards them to the MAC address that corresponds to the network address of the destination network.

In the foregoing specification the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A router comprising:
   a port for coupling to a multiplexing fabric that carries internetwork traffic for a plurality of distinct networks, the multiplexing fabric providing a plurality of distinct communication channels for each of the plurality of distinct networks; and
   a routing engine configured to determine a best route to route the internetwork traffic between the plurality of distinct networks.

2. The router of claim 1 wherein the multiplexing fabric comprises a link that operates according to an Asynchronous Transfer Mode (ATM) protocol, the router further comprising:
   an ATM interface for coupling to the link, the ATM interface including a plurality of virtual channels (VCs), each VC being assigned to a corresponding one of the plurality of distinct networks, the routing engine routing internetwork traffic between VCs when a first network connected to the multiplexing fabric transmits data to a second network connected to the multiplexing fabric.

3. The router of claim 1 wherein the multiplexing fabric comprises a shared medium that operates according to a first network type, each of the networks being coupled to the shared medium, the router further comprising:
   a media access controller for coupling to the shared medium, each of the plurality of networks and the media access controller being assigned a unique local address of the shared medium, the routing engine routing internetwork traffic between the plurality of networks by encapsulating internetwork packets received from a first network coupled to the shared medium as packets of the first network type and forwarding the internetwork packets to the local address of a second network.

4. A networking arrangement comprising:
   a plurality of distinct networks;
   a multiplexing fabric coupled to the plurality of distinct networks for carrying internetwork traffic for the plurality of distinct networks, the multiplexing fabric providing a plurality of distinct communication channels for each of the plurality of distinct networks; and a router having a port configured to transmit and receive internetwork packets comprising the internetwork traffic via the plurality of distinct communication channels for each of the plurality of distinct networks from the multiplexing fabric.

5. The networking arrangement of claim 4 wherein the multiplexing fabric comprises a link that operates according to an Asynchronous Transfer Mode (ATM) protocol, the router further comprising:

an ATM interface for coupling to the link, the ATM interface including a plurality of virtual channels (VCs), each VC being assigned to a corresponding one of the plurality of networks, the router routing internetwork traffic between VCs when a first network connected to the multiplexing fabric transmits data to a second network connected to the multiplexing fabric.

6. The networking arrangement of claim 4 wherein the multiplexing fabric comprises a shared medium that operates according to a first network type, each of the networks being coupled to the shared medium, the router further comprising:

a media access controller for coupling to the shared medium, each of the plurality of networks and the media access controller being assigned a unique local address of the shared medium, the router routing internetwork traffic between the plurality of networks by encapsulating internetwork packets received from a first network coupled to the shared medium as packets of the first network type and forwarding the internetwork packets to the local address of a second network.

7. A router comprising:

a physical interface for coupling to a single transmission line that carries internetwork traffic for a plurality of distinct networks in a multiplexed manner, the single transmission line providing access to a plurality of distinct communication channels for each of the plurality of distinct networks; and a routing engine that receives and transmits network traffic between a plurality of logical networks using the physical interface and is configured to determine a best route for the network traffic.

8. The router of claim 7 wherein the single transmission line operates according to an Asynchronous Transfer Mode (ATM) protocol, the router further comprising:

an ATM interface for coupling to a link, the ATM interface including a plurality of virtual channels (VCs), each VC being assigned to a corresponding one of the plurality of networks, the routing engine routing internetwork traffic between VCs when a first network connected to a multiplexing fabric transmits data to a second network connected to the multiplexing fabric.

9. The router of claim 7 wherein the single transmission line is coupled to a shared medium that operates according to a first network type, each of the networks being coupled to the shared medium, the router further comprising:

a media access controller for coupling to the shared medium, each of the plurality of networks and the media access controller being assigned a unique local address of the shared medium, the routing engine routing internetwork traffic between the plurality of networks by encapsulating internetwork packets received from a first network coupled to the shared medium as packets of the first network type and forwarding the internetwork packets to the local address of a second network.

10. A networking arrangement comprising:

a plurality of distinct networks;

a multiplexing fabric coupled to the plurality of distinct networks for carrying internetwork traffic for the plurality of distinct networks, the multiplexing fabric providing a plurality of distinct communication channels for each of the plurality of distinct networks; and a router having a physical interface configured to transmit and receive internetwork packets comprising the internetwork traffic via the plurality of distinct communication channels for each of the plurality of distinct networks from the multiplexing fabric by a transmission line.

11. The networking arrangement of claim 10 wherein the multiplexing fabric comprises a link that operates according to an Asynchronous Transfer Mode (ATM) protocol, the router further comprising:

an ATM interface for coupling to the link, the ATM interface including a plurality of virtual channels (VCs), each VC being assigned to a corresponding one of the plurality of networks, the router routing internetwork traffic between VCs when a first network connected to the multiplexing fabric transmits data to a second network connected to the multiplexing fabric.

12. The networking arrangement of claim 10 wherein the multiplexing fabric comprises a shared medium that operates according to a first network type, each of the networks being coupled to the shared medium, the router further comprising:

a media access controller for coupling to the shared medium, each of the plurality of networks and the media access controller being assigned a unique local address of the shared medium, the router routing internetwork traffic between the plurality of networks by encapsulating internetwork packets received from a first network coupled to the shared medium as packets of the first network type and forwarding the internetwork packets to the local address of a second network.

13. A method for transferring data between a plurality of distinct networks comprising:

receiving an internetwork packet from a first network via a first physical interface of a router, the internetwork packet being destined for a second network; and routing the internetwork packet via a second physical interface of the router if a best route to the second network includes the second physical interface; otherwise routing the internetwork packet via the first physical interface of the router when the best route to the second network includes the first physical interface, the first and second physical interfaces providing access to distinct communication channels for each of the first and second networks.

14. A router comprising:

a physical interface that operates according to an Asynchronous Transfer Mode (ATM) protocol for coupling to an ATM link, a plurality of virtual channels being defined in the ATM link, the physical interface providing access to a plurality of distinct communication channels for each of a plurality of distinct networks; and a routing engine coupled to the physical interface, the routing engine being operative to route packets received from a first virtual channel of the ATM link to a second virtual channel of the ATM link according to a best route determined by the router.

15. A router comprising:

a port for coupling to a multiplexing fabric that carries internetwork traffic for a plurality of distinct networks that operate according to different network protocols, the multiplexing fabric providing a plurality of distinct communication channels for each of the plurality of distinct networks; and a routing engine that routes internetwork traffic received from the port according to a best route.

16. The router of claim 15 wherein the routing engine routes internetwork traffic between the plurality of distinct networks using the port.

* * * * *

UNITED STATES PATENT AND TRADEMARK OFFICE
CERTIFICATE OF CORRECTION

PATENT NO. : 5,930,257
DATED : July 27, 1999
INVENTOR(S) : Smith, et. al.

It is certified that error appears in the above-indentified patent and that said Letters Patent is hereby corrected as shown below:

Title page, item [73], Assignee, delete "Baynetworks, Inc." and insert -- Bay Networks, Inc., Billerica, MA --

Signed and Sealed this

Thirteenth Day of March, 2001

*Attest:*

NICHOLAS P. GODICI

*Attesting Officer*  *Acting Director of the United States Patent and Trademark Office*